United States Patent [19]

Provolt et al.

[11] Patent Number: 4,653,556
[45] Date of Patent: Mar. 31, 1987

[54] LOG SPLITTING MACHINE

[76] Inventors: Monte B. Provolt, P.O. Box 876, Eureka, Calif. 95501; Peter C. Taggart, 825 Huffard Rd., Orick, Calif. 95555

[21] Appl. No.: 835,648

[22] Filed: Mar. 3, 1986

[51] Int. Cl.$^4$ .............................................. B27L 7/00
[52] U.S. Cl. ................................. 144/3 K; 144/193 A
[58] Field of Search .................. 144/366, 3 K, 193 R, 144/193 A

[56] References Cited

U.S. PATENT DOCUMENTS

| | | | |
|---|---|---|---|
| 4,066,110 | 1/1978 | Sarno | 144/193 A |
| 4,157,105 | 6/1979 | Gansley | 144/193 A |
| 4,293,013 | 10/1981 | Phelps et al. | 144/193 A |
| 4,294,295 | 10/1981 | Olin | 144/193 A |

Primary Examiner—W. D. Bray
Attorney, Agent, or Firm—Melvin R. Stidham

[57] ABSTRACT

There is disclosed a log splitting machine comprising a rail with one or more chain saws near one end to sever fireplace lengths from the log. A hydraulic ram pushes the log from the other end to force the severed lengths through wedging knives. The hydraulic ram is mounted on a main carriage and, as it extends, a plunger carriage on the piston rod pushes against the log until, at the end of its stroke, a stop finger drops into a slot along the rail. This prevents the plunger carriage from returning along the rail, whereby retraction of the hydraulic ram pulls the cylinder carriage up behind the plunger carriage. Dogs pivoted on the sides of the rail are pivoted down by the passing carriage and then sprung back up to prevent its return. Then, after the saws sever two more lengths, the plunger is extended through a full stroke to split them and the stop finger drops into another slot in the rail, causing the cylinder carriage to be pulled up ahead of another set of pivoted dogs on retraction of the piston. When the log is completely split and the cylinder carriage completes its travel, the pivoted dogs are moved down to enable the carriage to be pulled back to the other end of the rail.

6 Claims, 6 Drawing Figures

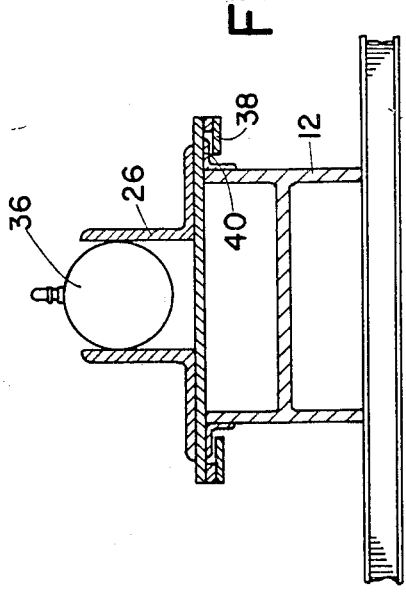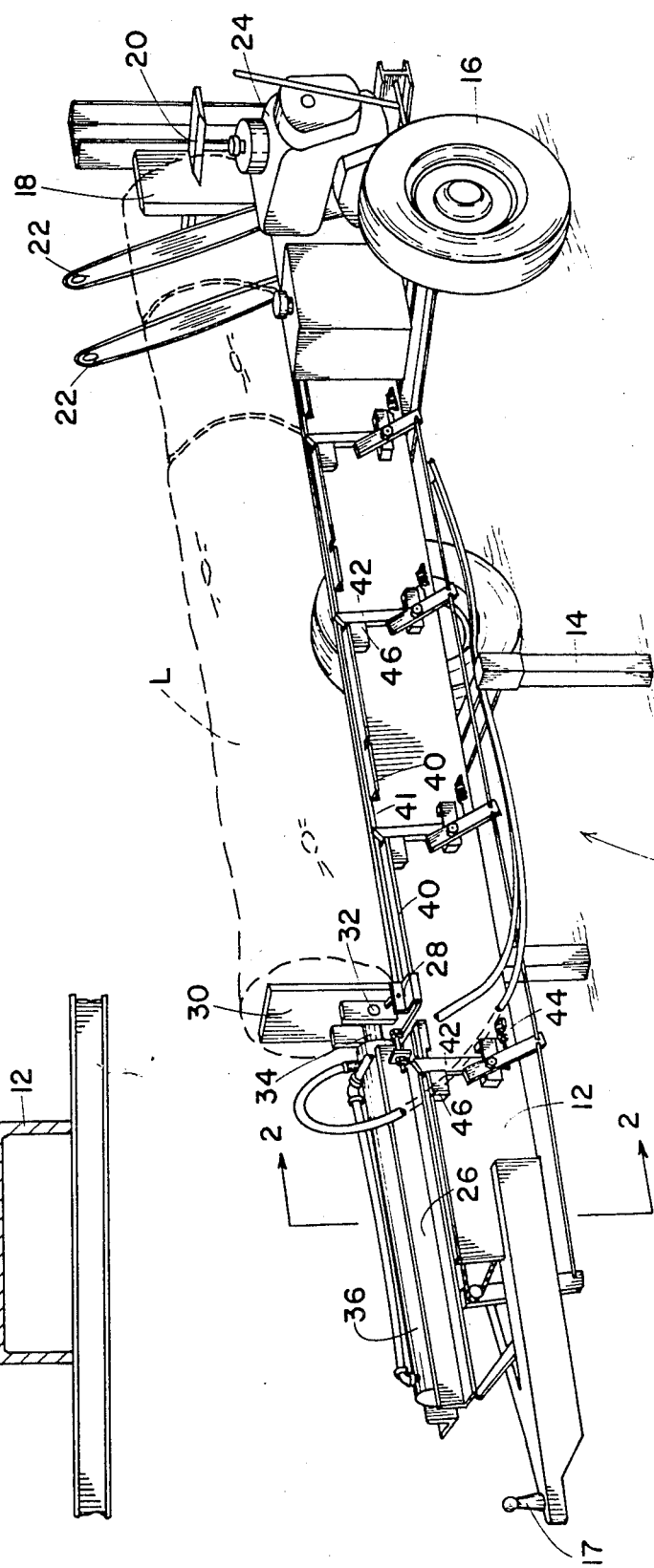

LOG SPLITTING MACHINE

BACKGROUND OF THE INVENTION

Log splitters presently used to produce firewood in substantial commercial quantities are large and complex machines that are extremely expensive. They generally include large circular saws and complex log handling and conveying devices, and require a crew of five to twelve people. Moreover, they are generally immobile and cannot readily be moved from job site to job site.

OBJECTS OF THE INVENTION

It is an object of this invention to provide a log splitting machine that is simple in construction and reliable in operation.

It is a further object of this invention to provide a log splitting machine that can be operated by one man.

It is a further object of this invention to provide a log splitting machine that is capable of delivering split logs of usable lengths from a single log more than ten feet in length.

It is a further object of this invention to provide a log splitting machine that can easily be moved to selected job sites.

It is a further object of this invention to provide a log splitter that can be fabricated from standard steel shapes and equipped with commercially available components.

Other objects and advantages of this invention will become apparent from the description to follow, particularly when read in conjunction with the accompanying drawings.

SUMMARY OF THE INVENTION

In carrying out this invention, we provide a generally horizontal beam or rail long enough to accommodate and support a log several feet in length. Log splitting wedges are fixed at one end of the beam and an adjacent pair of chain saws can cut through the log to sever two usable lengths from the end of the log. Then the log is pushed from the other end through a stroke sufficient to split the severed lengths. A hydraulic ram is mounted on a main carriage and on the end of the piston rod a pusher plate is mounted on a plunger carriage. Dogs pivoted on each side of the beam enable movement of the carriage in one direction only toward the splitting wedges. With the main carriage pushing against one pair of dogs, the piston rod is extended to split the logs. At the end of the stroke, a stop finger on the plunger carrier drops into a slot on the rail to prevent reverse movement of the plunger carriage. Accordingly, when the piston is retracted the cylinder carriage is pulled forward, up behind the plunger carriage to be engaged by another pair of dogs. Then, after the saws sever two more fireplace lengths, the plunger carriage is again extended to split them. Following this, the main carriage is again pulled along the carriage rail and past another pair of dogs, against which it is braced for another cycle.

BRIEF DESCRIPTION OF THE DRAWINGS

In the drawings:

FIG. 1 is a view in perspective showing the log splitter of this invention;

FIG. 2 is a section view taken along line 2—2 of FIG. 1;

DESCRIPTION OF A PREFERRED EMBODIMENT

Figure 3:
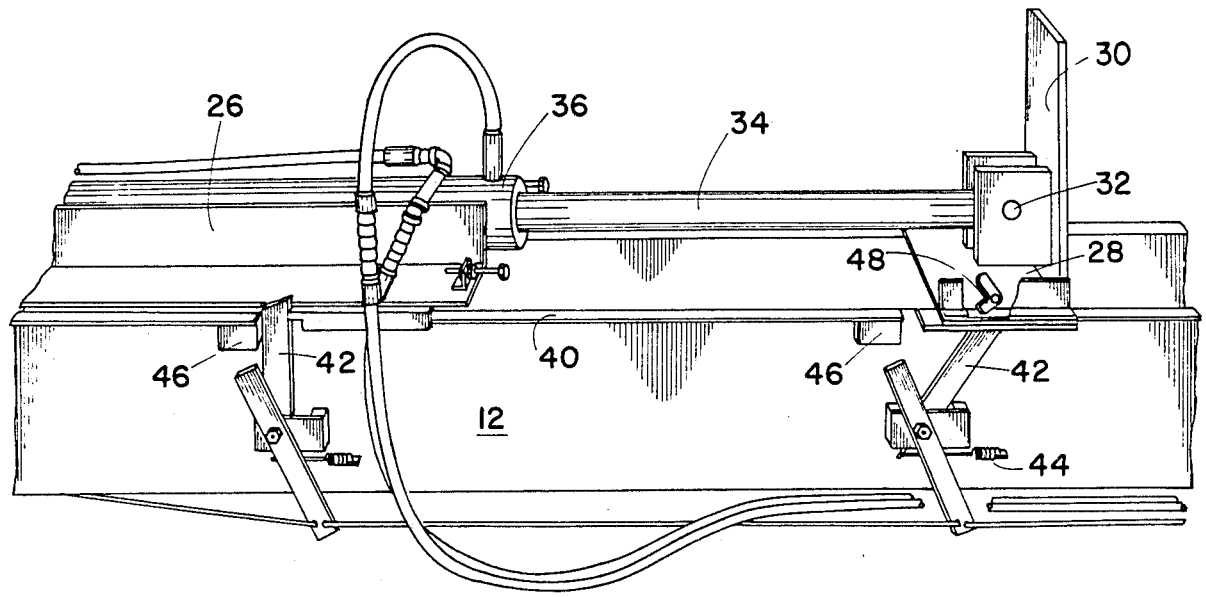
FIG. 3 is a partial view in perspective showing movement of the plunger rod during extension of the hydraulic ram.
Figure 4:
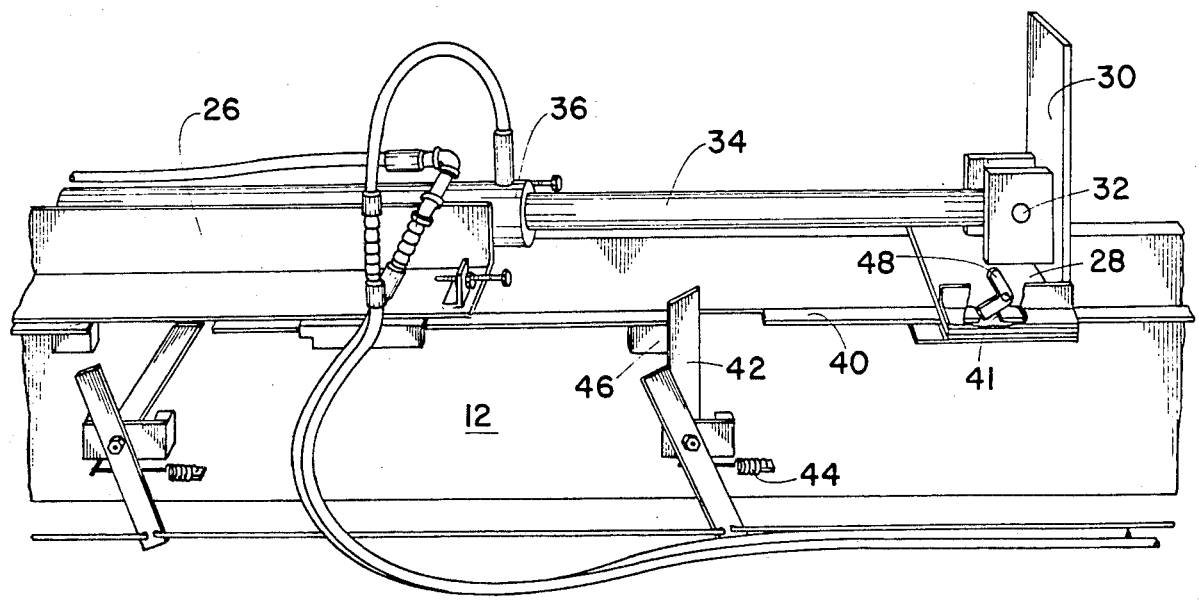
FIG. 4 is a partial view in perspective showing movement of the main carriage during retraction of the piston rod.

Referring now to FIG. 1 with greater particularity, the log splitter 10 of this invention comprises a horizontal bed or beam 12, which may be of H-beam configuration (FIG. 2). The beam 12 is mounted on suitable supports, such as legs 14 and wheels 16, and may be adapted, as at 17 for hitching to a vehicle to be pulled to and from job sites. Rigidly fixed at one end of the beam 12 are vertical 18 and horizontal 20 splitting wedges against which a log L is driven to split it into quarters.

The beam 12 is preferably long enough to accommodate a log L of 10 to 15 feet in length, and mounted near the end of the beam 12 is a pair of chain saws 22, which may be pivoted down by any suitable means as a hydraulic ram (not shown) to sever the log into fireplace lengths of 16 to 18 inches. The chain saws may be driven by a gasoline engine 24 with suitable clutch means (not shown) to drive the saws during a cutting stroke.

Slidably mounted on the beam 12 are a main carriage 26 and a pusher or plunger carriage 28. The pusher carriage 28 carries a pressure plate 30 that pushes against the end of a log L to drive it against the cutting wedges 18 and 20. The pusher plate 30 is pivotally connected at 32 to the end of a piston rod 34 driven by a hydraulic ram 36, the hydraulic ram 36 being mounted on the main carriage 26.

The main carriage 26 and pusher carriage 28 are guided to slide along the beam 12 by engagement of inturned lips 38 on the carriages with angles 40 (FIG. 2) that are welded to and along the beam 12.

Pivotally mounted at regular intervals along the beam 12, are dogs 42 that are biased by springs 44 against stop blocks 46. The dogs extend through gaps 41 formed in the guide rail 40 and when engaged by a carriage 26 or 28 are pivoted downward in a clockwise direction to enable the carriage to pass, but will block any movement in a reverse direction. As shown in FIG. 3, the carriage 26 is braced against one dog, which is pressed against its stop block 46, while the plunger carriage 28 is driven forward to pivot the next dog down in a clockwise direction. As soon as the plunger carriage 28 passes, the dog 42 will pivot back up against the stop block by means of the tension spring 44.

In the meantime, a plunger stop finger 48 carried on the pusher carriage 28 rides along the top of the guide rail 40 until, at the end of a stroke it drops into a gap 41 in the guide rail 40. As a result, the pusher carriage 28 cannot be pulled back along the rail 40. Therefore, reaction of the piston into the cylinder 36, pulls the cylinder and, hence, the carriage 26 forwardly along the track 40 to engage and pivot the next dog 42 against the action of its spring 44. When the dog is ivoted back against the stop block 46 it provides a second base against which the carriage 46 can push to drive the plunger assembly 30 forward.

In operation, a log L approximately 11 feet in length in placed on the rail or beam 12, and the chain saws 22 are operated and pivoted down to sever two lengths of fireplace size. Then, the plunger assembly 28 is driven forward to push the log L through a stroke of about 36 inches, enough to split the two severed logs. At the end of the stroke, the plunger stop finger 48 engages in a gap 41 in the rail 40, whereby the plunger assembly cannnot be returned. Then, the piston is retracted in the cylinder to pull the cylinder 36 and main carriage assemby 26 forward to engage behind the next set of dogs 42. Then, the chain saws are pivoted down to sever another pair of lengths of fireplace size and, following this, the plunger assembly is driven forward until the newly severed logs have been split into eight pieces. This procedure is repeated until the entire log L is severed and split.

Figure 5:
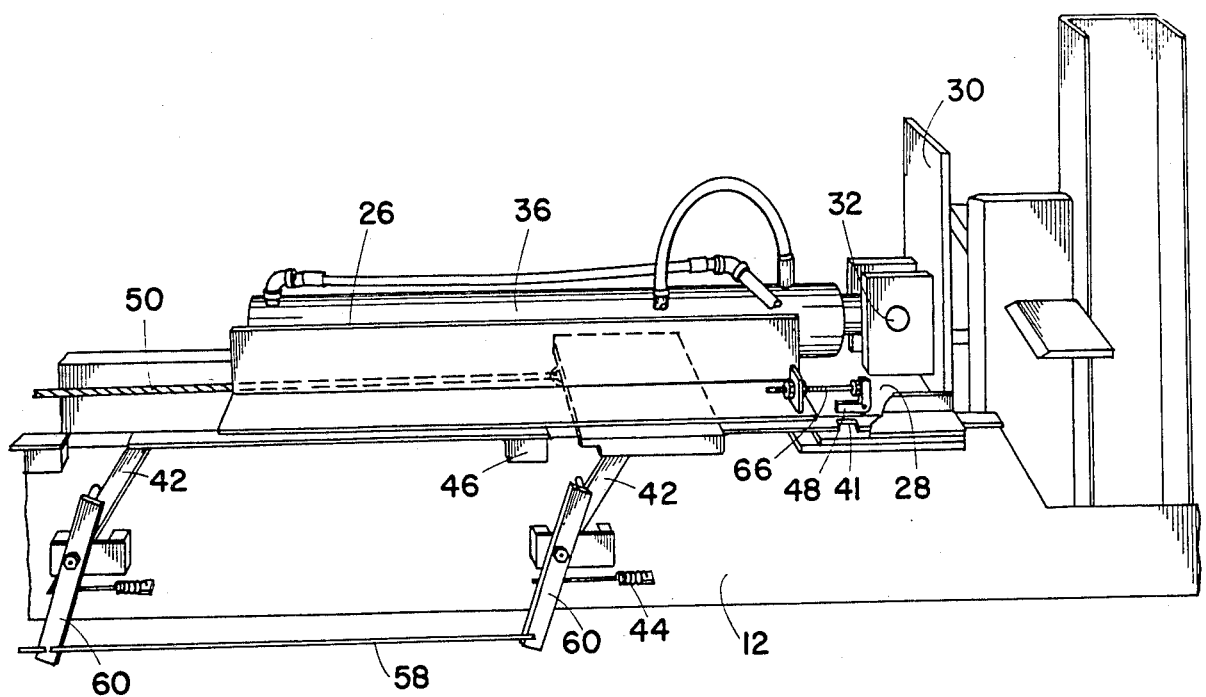
FIGS. 5 and 6 are partial views in perspective showing release of the one-way stop members and return of the carriages.
Figure 6:
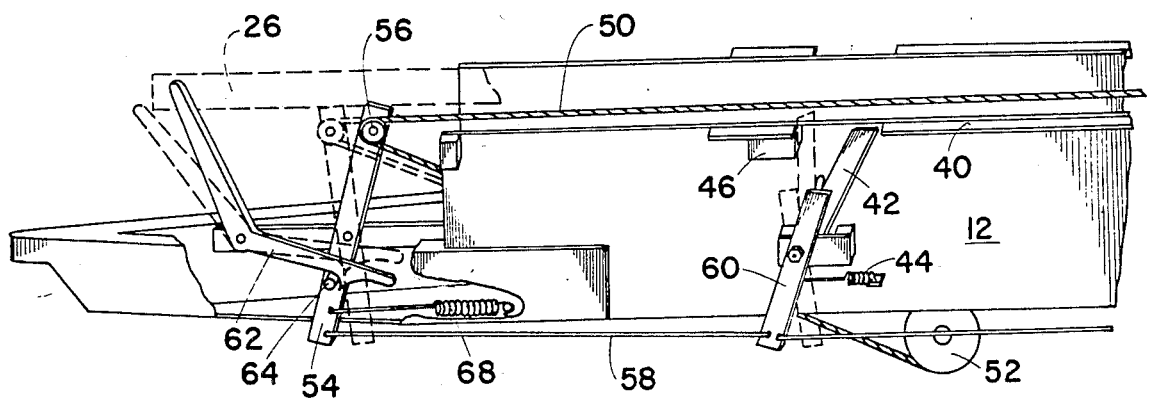

Referring now to FIGS. 5 and 6, as the main carriage 26 moves along the beam 12 it pulls a cabel 50 that is wound on a winch 52. Then, when the carriage 26 reaches the end of its travel, the cable 50 is pulled taut to pivot a trip lever 54 carrying a pulley 56 around which the cable is strung. The trip lever 54 pulls a rod 58 that is attached to a series of dog inactivator arms 60, each of which is pivoted to the side of the beam 12 adjacent one of the dogs 42. Hence, when each inactivator arm 60 is pivoted clockwise in the drawings, it engages and pivots the adjacent dog 42 also in a clockwise direction below the guide rails 40 and enable return of the carriages 26 and 28 by winding the cable 50 onto the winch.

In the meantime, the plunger stop finger 48 which has engaged in a slot 41 in the rail 40, is disengaged by a trip bolt 66 on a carriage 26 as the carriage 26 is pulled up to the plunger carriage 28. With the stop finger 48 so disengaged, the carriage 26 and 28 can be returned as a unit. The trip lever 54 and inactivator arm 60 are held in the position shown in solid lines in FIG. 6 by means of a locking hook 62 that engages over a pin 64 on the trip lever. This holds all of the dogs 42 down until the cable 50 is rewound onto the winch 52 to return the carriage 26.

When the carriage 26 returns to the position shown in dotted lines in FIG. 6, the hook arm 62 is depressed to release the trip lever, whereby it is returned by a strong spring 68 to allow all of the dogs to be returned by their springs 44.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A log splitting machine comprising:
    a rail;
    a splitting wedge fixed at one end of said rail;
    at least one saw movable transversely of said rail near said one end thereof to sever length from a log thereon;
    a main carriage movable along said rail;
    a pressure-fluid ram on said main carriage including a piston rod extending therefrom;
    a plunger carriage movable along said rail driven by said piston rod;
    a plunger plate on said plunger carriage to engage and push the end of a log supported lengthwise on said rail;
    interengaging means on said carriages and said rail to enable movement of said carriages in one direction only so that extension of said piston rod from said ram will drive said plunger carriage forward and retraction of said piston rod will pull said main carriage forward, behind said plunger carriage;
    means for inactivating said interengaging means; and
    means for returning said carriages to the other end of said rail.

2. The log splitting machine defined by claim 1 wherein said interengaging means comprises:
    a series of upright dogs pivotally mounted on said rail at intervals therealong;
    said dogs being engageable by said carriages and thereby being pivoted in one direction to allow passage thereof in a forward direction;
    stop members adjacent said dogs to prevent pivotal movement thereof in the opposite direction; and
    spring means biasing said dogs against said stop members.

3. The log splitting machine defined by claim 2 including:
    inactivating levers adjacent said dogs which, when pulled, pivot said dogs out of the path of said carriages to allow return thereof; and
    means for pulling said inactivating levers when said carriages reach said one end of the rail.

4. The log splitting machine defined by claim 3 including:
    means for returning said carriages when said carriages reach said one end of the rail.

5. The log splitting machine defined by claim 2 including:
    a stop finger pivoted on said plunger carriage and disposed to ride along the top of said rail; and
    means forming a gap in said rail at intervals corresponding to a stroke of said piston rod so that said stop finger will drop into said gap and prevent return of said plunger carriage.

6. The log splitting machine defined by claim 5 including:
    means on said main carriage to engage said stop finger and disengage same from said gap when said piston rod is fully retracted.

* * * * *